United States Patent
Nishihara et al.

(10) Patent No.: US 8,533,726 B2
(45) Date of Patent: Sep. 10, 2013

(54) DEVICE, SYSTEM, METHOD, AND PROGRAM FOR COMPUTING RESOURCE ALLOCATION BASED ON EXTERNAL ENVIRONMENT AND TRANSITION FREQUENCY

(75) Inventors: Kosuke Nishihara, Tokyo (JP); Kazuhisa Ishizaka, Tokyo (JP)

(73) Assignee: NEC Corporation, Tokyo (JP)

( * ) Notice: Subject to any disclaimer, the term of this patent is extended or adjusted under 35 U.S.C. 154(b) by 118 days.

(21) Appl. No.: 13/145,900

(22) PCT Filed: Feb. 16, 2010

(86) PCT No.: PCT/JP2010/052580
§ 371 (c)(1),
(2), (4) Date: Jul. 22, 2011

(87) PCT Pub. No.: WO2010/098268
PCT Pub. Date: Sep. 2, 2010

(65) Prior Publication Data
US 2011/0276980 A1    Nov. 10, 2011

(30) Foreign Application Priority Data
Feb. 24, 2009    (JP) ................................ 2009-040405

(51) Int. Cl.
*G06F 9/46* (2006.01)
(52) U.S. Cl.
USPC ....................................................... 718/104
(58) Field of Classification Search
None
See application file for complete search history.

(56) References Cited

U.S. PATENT DOCUMENTS

| 7,487,918 B2 | 2/2009 | Kudo et al. | |
|---|---|---|---|
| 7,733,220 B2* | 6/2010 | Libby | 340/539.1 |
| 2005/0251325 A1* | 11/2005 | Kudo et al. | 701/200 |
| 2009/0089795 A1* | 4/2009 | Yoshida et al. | 718/107 |

FOREIGN PATENT DOCUMENTS

| JP | 2007-237913 A | 9/2007 |
|---|---|---|
| JP | 2007-263972 A | 10/2007 |
| JP | 2007-313104 A | 12/2007 |
| WO | WO 2008/062512 A1 | 5/2008 |

OTHER PUBLICATIONS

Kosuke Nishihara et al., User Context Aware Resource Allocation for Application Performance Control, IEICE Technical Report, Mar. 2009, pp. 91-95, vol. 108, No. 487.

* cited by examiner

*Primary Examiner* — Emerson Puente
*Assistant Examiner* — Gregory A Kessler
(74) *Attorney, Agent, or Firm* — Foley & Lardner LLP

(57) ABSTRACT

Provided is a computing resource allocation device capable of allocating computing resources to accommodate changing activity patterns. The device is equipped with an external environment recognition means that analyzes input values from sensors to specify the current environment, a memory means that stores a table in which the sensors required to specify the environment are correlated, a transition frequency computation means that computes the transition frequency at which a transition is made from an environment to another environment, and a computing resource allocation means that computes the amount of allocation of the computing resources to be used for the analysis based on the current environment by referencing the table and the transition frequency, and that allocates the computing resources for the analysis.

22 Claims, 5 Drawing Sheets

DEVICE, SYSTEM, METHOD, AND PROGRAM FOR COMPUTING RESOURCE ALLOCATION BASED ON EXTERNAL ENVIRONMENT AND TRANSITION FREQUENCY

This application is the National Phase of PCT/JP2010/052580, filed Feb. 16, 2010, which claims priority to Japanese Application No. 2009-040405, filed Feb. 24, 2009, the disclosures of which are hereby incorporated by reference in their entirety.

TECHNICAL FIELD

The present invention relates to a computing resource allocation device, a computing resource allocation system, a computing resource allocation method thereof and a program, which perform sensing data analysis processing according to the allocated amount of computing resources.

BACKGROUND ART

In embedded equipments such as car navigation equipments and mobile telephones, in recent years, the performance enhancements such as multi-function and processing performance improvement or the like advance. Also, user's preference and behavior become complicated, and the user's demands for those embedded equipments diversify.

For this reason, the embedded equipment can meet the user's demands corresponding to the use scene, and can improve convenience, based on controlling the embedded equipment depending on the user's use situation or the like (external environment). Further, the external environment can be perceived by analyzing input information from a plurality of external sensors such as a camera and a microphone.

However, because it is limited in computing resources, the embedded equipment cannot allocate enough computing resources for performing each sensing data analysis processing. Accordingly, the embedded equipment needs to allocate the computing resources to be allocated to the sensing data analysis processing appropriately.

As such technology, for example, in the patent document 1, it is disclosed about technology which judges the current situation from a plurality of sensors, and allocates resources with reference to a table which correlates a priority to the judged situation.

[Patent document 1] Japanese Patent Application Publication No. 2007-237913

DISCLOSURE OF THE INVENTION

Problem to be Solved by the Invention

However, users may not always behave with constant probability in every environment (for example, in a difference of the weather). Also, behavior patterns are different by users. Therefore, it cannot completely correlate the situation to a priority of behavior with one to one. Therefore, it is insufficient for the embedded equipment only to allocate resources by referring to the table which correlates the situation with the priority in advance.

Further, in a case where there are many external environments, because it becomes complicated to decide allocation of the most suitable computing resources for each environment, it is difficult to manually allocate the computing resources to each sensing data analysis processing in an appropriate manner.

Further, there is a possibility that the most suitable computing resource allocation may be different for each user, and there is a problem that the optimum value is not known in advance. Also, in the system that an external environment to be recognized is added based on the user, the optimum value is not known in advance in a similar way as mentioned above.

Accordingly, the present invention has been made in view of the above-mentioned problem, and the object is to provide a computing resource allocation device for allocating computing resources which can correspond with changing behavior patterns.

Means for Solving the Problem

In order to solve the above-mentioned problem, a computing resource allocation device in the present invention is characterized by comprising: an external environment recognition means for analyzing an input value from a sensor, and specifying a current environment, a memory means for storing a table which correlates the sensor required for specifying an environment, a transition frequency computation means for computing a transition frequency that an environment changes to another environment, and a computing resource allocation means for computing an allocation amount of computing resources to be used for the analysis with referring to the table and the transition frequency based on the current environment, and allocates the computing resources for the analysis.

Also, a computing resource allocation system in the present invention is the computing resource allocation system including plural sensors and a computing resource allocation device which analyzes input values from the sensors, characterize in that: the sensor includes a transmitting means for transmitting a detected input value to the computing resource allocation device, and the computing resource allocation device characterized by comprising: an external environment recognition means for analyzing the input value from the sensors, and specifying a current environment, a memory means for storing a table which correlates the sensor required for specifying an environment, a transition frequency computation means for computing a transition frequency that an environment changes to another environment, and a computing resource allocation means for computing an allocation amount of computing resources to be used for the analysis with referring to the table and the transition frequency based on the current environment, and allocating the computing resources for the analysis.

Also, a computing resource allocation method of a computing resource allocation device in the present invention characterized by comprising: an external environment recognition step for analyzing an input value from a sensor, and specifying a current environment, a transition frequency computation step for computing a transition frequency that an environment changes to another environment, and a computing resource allocation step for computing an allocation amount of computing resources to be used for the analysis with referring to a table which correlates the sensor required for specifying the environment from the current environment and the transition frequency, and allocating the computing resources for the analysis.

Also, a computing resource allocation method of a computing resource allocation system in the present invention characterized by comprising: a transmitting step for transmitting input values detected by plural sensors to a computing resource allocation device, an external environment recognition step for analyzing an input value from the sensor using the computing resource allocation device, and recognizing an external environment which specifies a current environment, a transition frequency computation step for computing a transition frequency that an environment changes to another environment, and a computing resource allocation step for computing an allocation amount of computing resources to be used for the analysis with referring to a table which correlates the sensor required for specifying the environment from the current environment and the transition frequency, and allocating the computing resources for the analysis.

Also, a program in the present invention making a computer work as: an external environment recognition process for analyzing an input value from sensors, and recognizing an external environment which specifies a current environment, a transition frequency computation process for computing a transition frequency that an environment changes to another environment, and a computing resources allocation process for computing an allocation amount of computing resources to be used for the analysis with referring to a table which correlates the sensor required for specifying the environment from the current environment and the transition frequency, and allocating the computing resources for the analysis.

Also, a program in the present invention making a computer work as: a transmitting process for transmitting input values detected by plural sensors to a computing resource allocation device, an external environment recognition process for analyzing an input value from a sensor using the computing resource allocation device, and recognizing an external environment which specifies a current environment, a transition frequency computation process for computing a transition frequency that an environment changes to another environment, and a computing resources allocation process for computing an allocation amount of computing resources to be used for the analysis with referring to a table which correlates the sensor required for specifying the environment from the current environment and the transition frequency, and allocating the computing resources for the analysis.

The Effect of the Invention

Based on the present invention, it becomes possible to allocate the computing resources in correspondence with a change of the behavior pattern based on the difference in environments and users who operate.

DESCRIPTION OF CODE

| | |
|---|---|
| 100 | a computing resource allocation device |
| 111, 112 | a sensor |
| 121, 122 | an analysis unit |
| 131 | an external environment recognition unit |
| 141 | a computing resource allocation unit |
| 142 | a transition frequency computation unit |
| 151 | a memory unit |

BEST MODE FOR CARRYING OUT THE INVENTION

Next, the best mode for carrying out the invention will be described in detail with reference to drawings.

Figure 1:
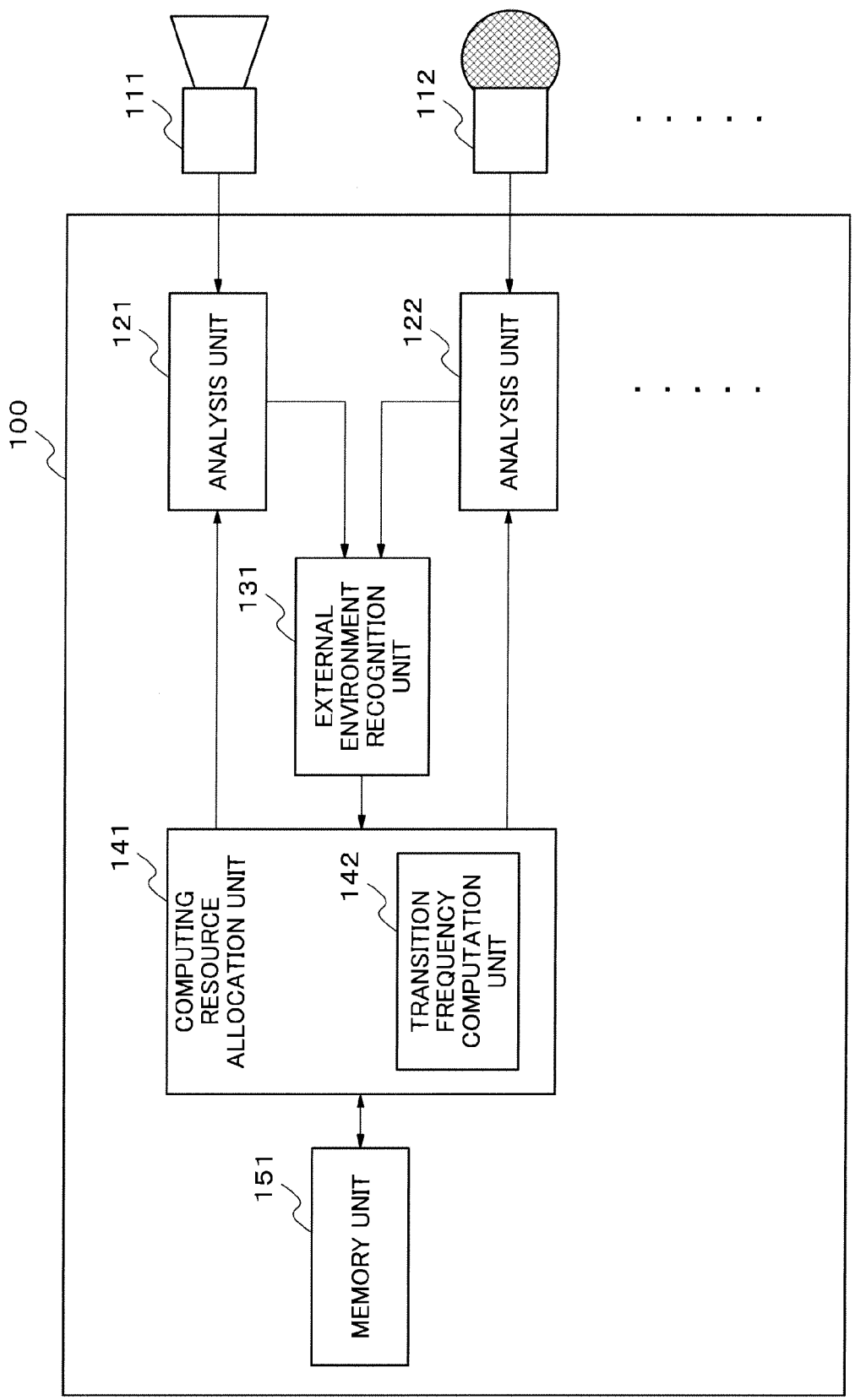
FIG. 1 is a functional block diagram of a computing resource allocation system according to an exemplary embodiment of the present invention.

FIG. 1 is a configuration diagram of a computing resource allocation system in an exemplary embodiment of the present invention. This computing resource allocation system is constituted by including a computing resource allocation device 100 and plural sensors 111, 112, . . . .

Each sensor 111, 112, . . . is constituted by, for example, a camera or a microphone, and outputs as sensing data by detecting surrounding sight or sound to each analysis unit 121, 122, . . . .

The computing resource allocation device 100 is constituted by including analysis units 121, 122, . . . , an external environment recognition unit 131, a computing resource allocation unit 141, and a memory unit 151.

The each analysis unit 121, 122, . . . analyzes the sensing data from each sensor 111, 112, . . . and conveys the analysis result to the external environment recognition unit 131. For example, the analysis processing in the analysis unit 121 is the facial recognition and the behavior recognition using a camera and the analysis processing in the analysis unit 122 is the sound recognition using a microphone.

The external environment recognition unit 131 recognizes an external environment based on analysis information obtained from each analysis units 121, 122, . . . . For example, the external environment recognition unit 131 recognizes which user does what where, based on specifying of the utilizing user by using the facial recognition and the behavior recognition, grasping the use situation of the user, and specifying the utilizing location or the like based on the sound recognition.

The computing resource allocation unit 141 allocates computing resources to each analysis unit 121, 122, . . . , according to the external environment recognized based on the external environment recognition unit 131. That is, the computing resource allocation unit 141 performs such operation which reduces a computing resource allocation amount of the sensor which is judged not to be used in a certain external environment. This computing resource allocation amount may have been decided beforehand to the external environment in an initial state.

Also, the computing resource allocation unit 141 includes a transition frequency computation unit 142 and finds a transition frequency of external environment based on a result obtained from the external environment recognition unit 131. As computing of the transition frequency in the transition frequency computation unit 142, for example, when a recognized external environment has changed, it may compute the frequency that transfers from a specific external environment to another external environment, based on made statistical data such a histogram or the like for indicating which external environment is the external environment to be changed from the specific external environment.

The computing resource allocation unit 141 determines an importance of each sensor with reference to the transition frequency computed in the transition frequency computation unit 142 and a table of the sensor to be used for the external environment stored in the memory unit 151, and allocates the computing resources to each analysis unit 121, 122, . . . . That is, the computing resource allocation unit 141 determines an importance of required sensor in consideration of the environment in which currently existing and the environment to which it would transfer, and allocates the computing resources in accordance with that.

For example, the sensor for recognizing the external environment which frequently transfers to a certain external environment is important. The computing resource allocation unit 141 allocates more computing resources to the analysis unit which analyzes the sensing data from that sensor.

Further, the computing resource allocation unit 141 can optimize computing resource allocation in conformity with a user, by giving an initial state of importance to the computing resource allocation unit 141 in advance and adjusting the importance from the state based on the transition frequency. The relation between the transition frequency and the importance, and the relation of the adjusting value of computing resource allocation based on the importance are given to the computing resource allocation unit 141 in advance.

In the memory unit 151, the sensor required for recognizing each external environment is correlated with the external environment, and is stored. For example, when transition from a room is considered, the external environment recognition unit 131 judges the difference from an outdoor by using a temperature sensor, a camera and a microphone. However, in a car, because playing music or not is different depending on a person, a microphone becomes unnecessary from the subject matter for making environment judgment. Accordingly, when transition is considered for a case in a car, the required sensors will become a temperature sensor and a camera. Further, for the sake of simplicity here, it has explained whether using a sensor or not using as an example, however, it is not limited to this. For example, the memory unit 151 may store the weight of sensor for recognizing the external environment, such as 10% of data from a microphone is used as the information for making judgment even in a car.

Also, in the memory unit 151, data for using for computing of the transition frequency in the transition frequency computation unit 142 is stored. For example, this stored data is such that a transition history from a certain external environment to a certain external environment.

Further, the transition history may be stored separately according to the use situation such as the user and the weather. At that time, the transition frequency computation unit 142 judges the recognized external environment and the use situation, and can compute the transition frequency for the computing resource allocation according to each use situation, based on computations with reference to the transition history in each judged use situation.

Further, each function unit shown in FIG. 1 is the predetermined function unit which is realized using any one of software program and hardware when the computing resource allocation device 100 according to this exemplary embodiment is realized. Accordingly, it may realize a part or whole of these processing units as software or hardware.

Figure 2:
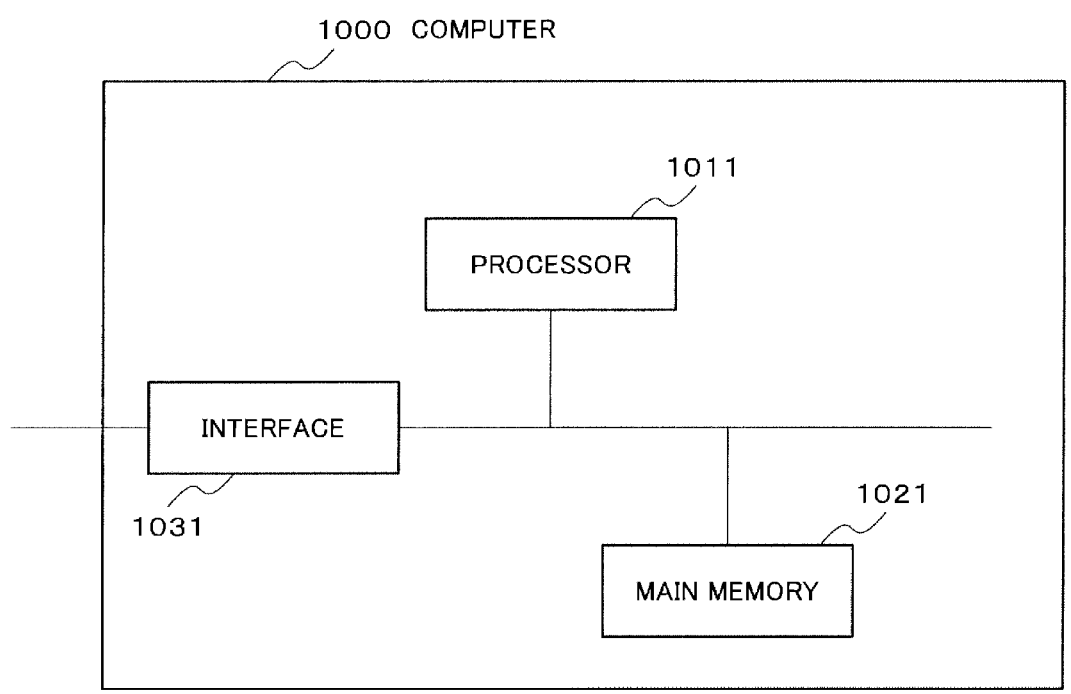
FIG. 2 is a configuration diagram of a computing resource allocation device according to an exemplary embodiment of the present invention.

When realizing it as a software program, the software program is executed on a computer 1000 having a processor 1011, a main memory 1021, and an interface 1031 as shown in FIG. 2.

The software program is stored in the main memory (storage medium) 1021 which can be read and written. The processor 1011 retrieves the software program from the main memory 1021 and executes.

In such a case, a part or whole of the processing units shown in FIG. 1 is constituted by using the software program codes or a storage medium.

Next, the processing of the computing resource allocation device 100 in the exemplary embodiment of the present invention will be described in detail with reference to a flowchart figure shown in FIG. 3.

Figure 3:
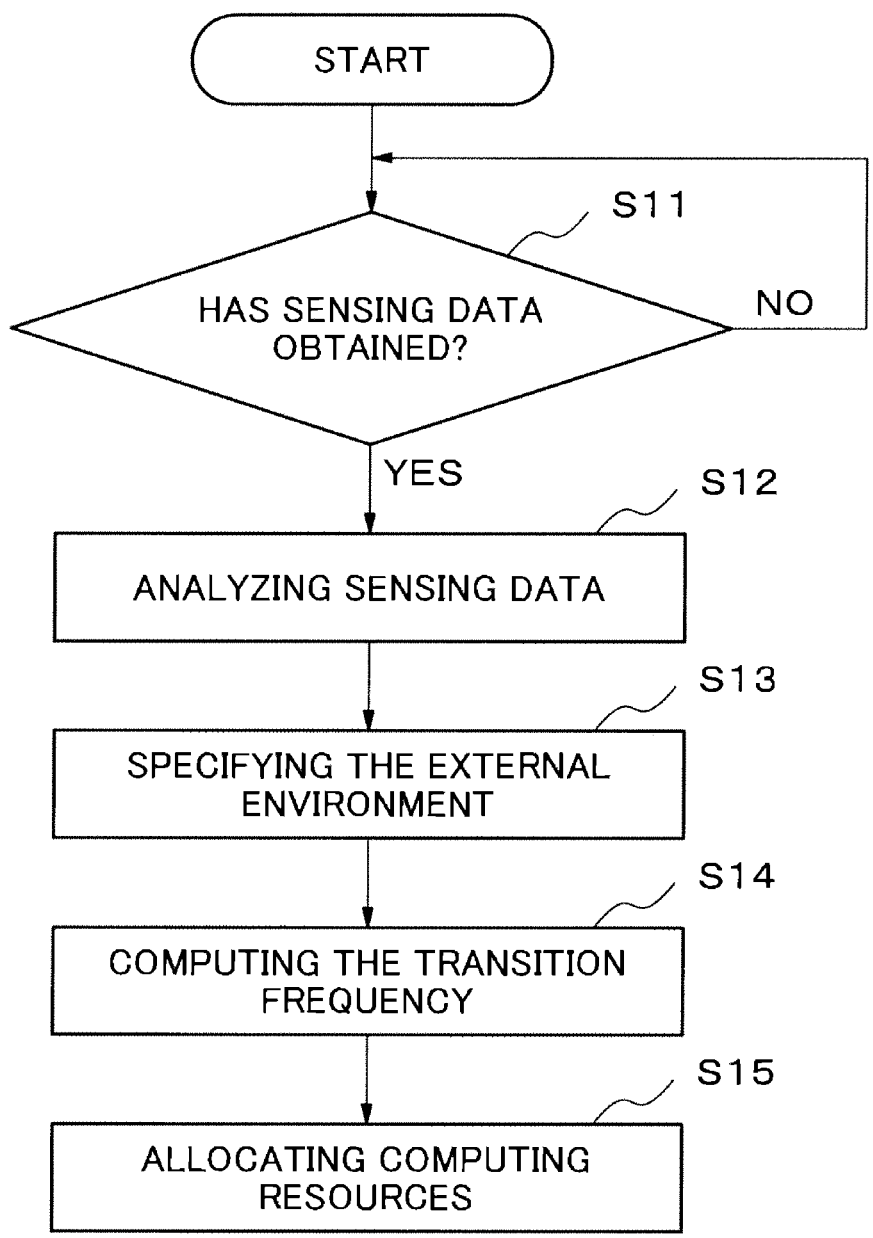
FIG. 3 is a flowchart figure of a computing resource allocation device according to an exemplary embodiment of the present invention.

The flowchart shown in FIG. 3 shows processing procedures of the software program which is executed by the processor 1011 in the computer 1000 shown in FIG. 2. Accordingly, each function unit shown in FIG. 1 will be described as the software program executed by the processor 1011.

First, when each sensor acquires sensing data (Step S11), the processor 1011 analyzes the sensing data based on the decided computing resource allocation (Step S12). Although the computing resource allocation is determined in Step S15, a predetermined initial value is used at the time of initiating a program. The analysis processing of each sensing data is executed by a time division manner in case that a computing core of the processor 1011 is single, and executed in parallel among different computing cores in case of plural.

The processor 1011 specifies the external environment based on the analysis result of each sensing data (Step S13). The processing for specifying of the external environment is performed at a fixed cycle or at the time when a certain sensing data analysis processing has completed. Because the analysis processing of each sensing data does not complete simultaneously, the external environment recognition processing specifies by using the analysis result of sensing data which is available at the present time. Further, similar to Step S12, the external environment recognition processing is executed by a time division manner in case that the computing core of the processor 1011 is single, and executed in parallel among different computing cores in case of plural.

The processor 1011 computes the transition frequency of each external environment based on the specified external environment (Step S14). Further, it may perform computing of the transition frequency when it is judged that the external environment has changed. Also, it may constitute so that the processor 1011 computes the frequency of transition which has changed to another external environment after passing a fixed time.

The processor 1011 determines the computing resource allocation amount of the analysis processing of each sensing data based on the transition frequency (Step S15). For example, the processor 1011 retains the relation between the transition frequency and the importance of each sensor, also, the relation of the adjusting value between the importance and the computing resource allocation in advance, and adjusts the computing resource allocation of the initial value based on the adjusting value of the computing resource allocation.

Thus, the computing resource allocation conforming to a user is automatically optimized based on adjusting the computing resource allocation which is allocated to the analysis of each sensing data according to the importance of each sensor which the processor 1011 has obtained from the transition frequency of the external environment. Further, the processor 1011 can contribute to energy saving by performing disablement such that it shuts down power of the sensor which is linked to analysis of the sensing data to which the computing resource allocation amount is 0.

EXAMPLE

Next, an example of the present invention will be described in detail with reference to drawings.

This example constituted by including two sensors, a camera and a microphone as the above mentioned sensors. The external environments which should be recognized are four states of the user who is walking, running, getting on a bus and getting on a train.

The external environment recognition unit 131 judges distinction of walking, running and getting on a vehicle (a bus or a train) based on recognizing the image data from the camera, and distinction of a bus or a train is judged based on recognizing the difference in the sound data using the microphone. (Refer to table 1)

TABLE 1

| State | Walking | Running | On a train | On a bus |
|---|---|---|---|---|
| Sensor | Camera | Camera | Camera Microphone | Camera Microphone |

In other words, this example relates to a computing resource allocation device 100 which allocates the computing resources to the respective analysis units 121, 122 of a camera and a microphone based on the computing resource allocation unit 141 in the system which recognizes four states at the time of walking, running, getting on a bus and getting on a train by using two sensors of a camera and a microphone.

Figure 4:
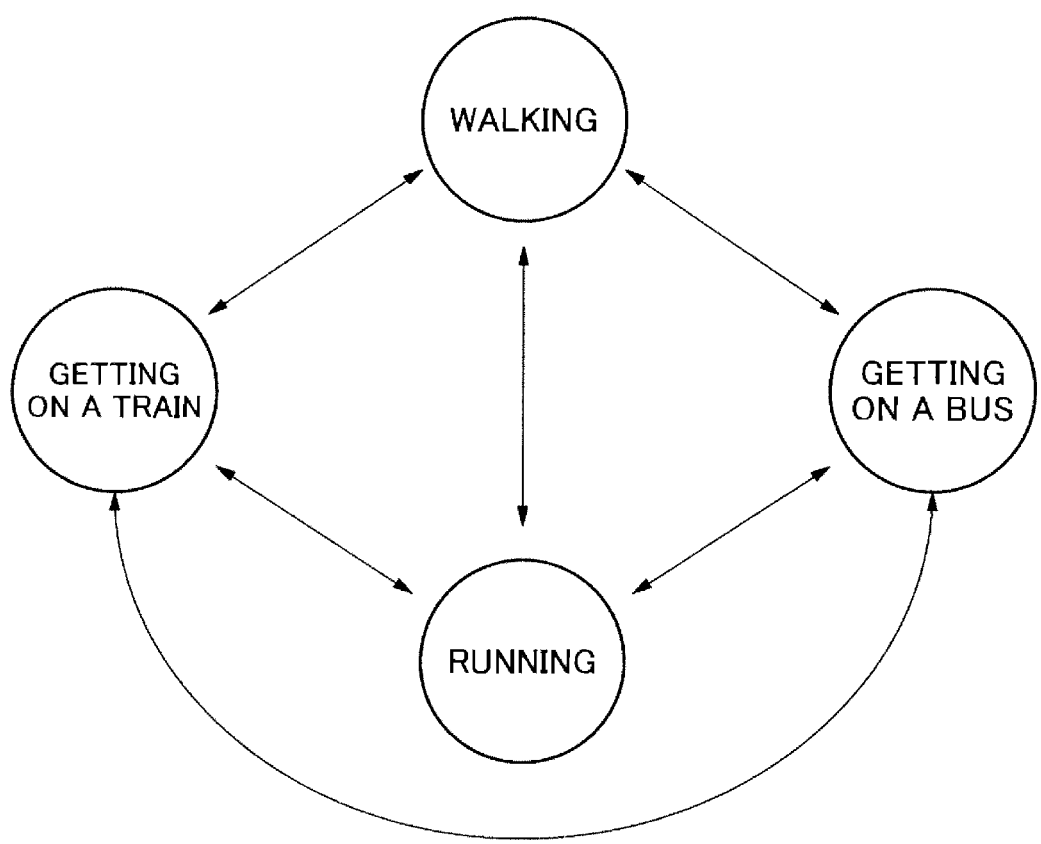
FIG. 4 is an explanatory diagram (1st) illustrating state transitions.
Figure 5:
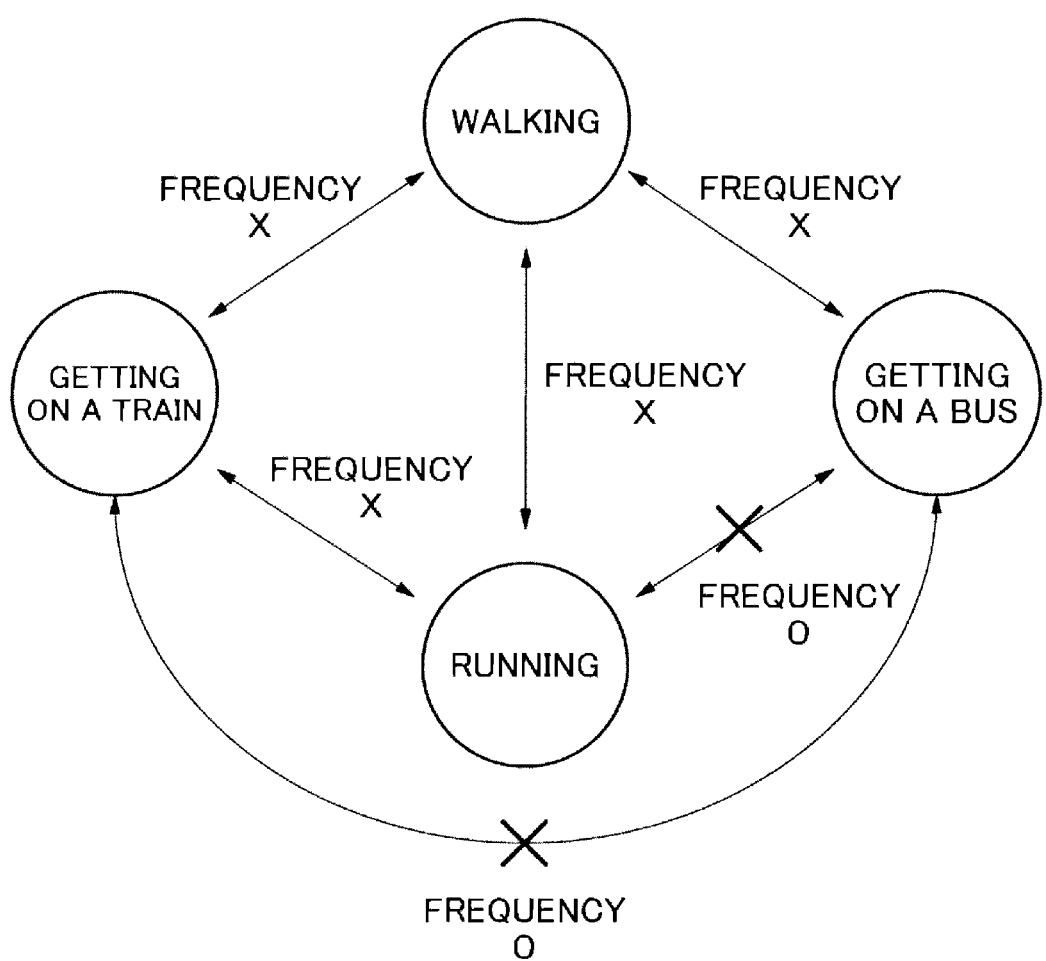
FIG. 5 is an explanatory diagram (2nd) illustrating state transitions.

Every possible state transition of four states of above is shown in FIG. 4. Here, it is supposed that the computing resource allocation unit 141 can judge, based on the transition frequency computed from a behavior history of a certain user, that this user does not get on a bus from a running state, does not start running from a bus, does not change momentarily from a bus to a train, from a train to a bus. In other words, the transition frequency becomes 0 in the transition from the running state to the getting on a bus state, from the getting on a bus state to the running state, from the getting on a bus state to the getting on a train state, and from the getting on a train state to the getting on a bus state (refer to FIG. 5). For the sake of simplicity, it is supposed that others are the same frequency (frequency X). However, in practice, each transition frequency is often different such that the transition frequency from the running state to the walking state is 70% and the transition frequency from the running state to the getting on a train state is 30%.

In case of this example, only from the walking state, there is the potential of transition to the getting on a bus state and the getting on a train state. For this reason, the external environment recognition unit 131 needs analysis of the sensing data of the microphone for judging getting on a bus and getting on a train only in the walking state, and in the other states, it can recognize the transition to which state it has changed only by analysis of the sensing data of the camera. Further, in a case of transition from the running state, because it changes to the getting on a train state but it does not change to the getting on a bus state, the sensing data of the microphone for discriminating these in the external environment recognition unit 131 becomes unnecessary. The computing resource allocation unit 141 can optimize the computing resource allocation in conformity with the user by allocating the computing resources to the analysis units 121, 122 based on such transition frequency.

For example, in the walking state, the computing resource allocation unit 141 allocates 50% of the computing resources to the analysis of each sensing data of the camera and the microphone. In the other states, the computing resource allocation unit 141 allocates 100% of the computing resources to the analysis of the sensing data of the camera, and so on (refer to table 2).

TABLE 2

| Current state | Walking | Running | On a train | On a bus |
|---|---|---|---|---|
| Needed sensor | Camera Microphone | Camera | Camera | Camera |
| Allocation computing amount | Camera: 50% Microphone: 50% | Camera: 100% Microphone: 0% | Camera: 100% Microphone: 0% | Camera: 100% Microphone: 0% |

Further, here, it has explained in the same transition frequency X for the transition to any state. However, the amount of the computing resource allocation will be further adjusted based on the transition frequency if there is a difference in the transition frequency such as, for example, the transition frequency from the walking state to the running state is 90% and the transition frequency from the walking state to the getting on a bus or a train state is 10%. When the current state at this time is the walking state, the computing resource allocation unit 141 can suppress unnecessary computing as much as possible based on setting, for example, the computing resource amount for the analysis unit 121 of the camera to 80% and the computing resource amount for the analysis unit 122 of the microphone to 20%.

Although the exemplary embodiment has been described above, various corrections and changes are possible to these exemplary embodiment and specific example without deviating from a widespread purpose and a range of the present invention which are defined in claims.

And while the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A computing resource allocation device comprising:
an external environment recognition unit which analyzes an input value from a sensor and specifies a current external environment;
a memory unit which stores a table which correlates a sensor required for specifying an external environment;
a transition frequency computation unit which computes a transition frequency that an external environment changes to another external environment; and
a computing resource allocation unit which computes an allocation amount of computing resources to be used for the analysis with referring to the table and the transition frequency based on an importance of the required sensor in consideration of the current external environment and an external environment to which the current external environment may change, and allocates the computing resources for the analysis.

2. The computing resource allocation device according to claim 1,
wherein said memory unit stores a transition history which is a history of transition when an environment has changed to another environment, and
said transition frequency computation unit computes the transition frequency with reference to said transition history.

3. The computing resource allocation device according to claim 2,
wherein said transition history stores respective histories by dividing into plural situations, and
said transition frequency computation unit computes the transition frequency with reference to the history of the same situation in said transition history.

4. The computing resource allocation device according to claim 1,
wherein said transition frequency computation unit computes the transition frequency when an environment has changed to another environment.

5. A computing resource allocation system including plural sensors and a computing resource allocation device which analyzes input values from said sensors, characterized in that:
said sensors comprising a transmitting unit which transmits a detected input value to said computing resource allocation device, and
said computing resource allocation device comprising:
an external environment recognition unit which analyzes the input values from said sensors, and specifies a current external environment;
a memory unit which stores a table which correlates a sensor required for specifying an external environment;
a transition frequency computation unit which computes a transition frequency that an external environment changes to another external environment; and
a computing resource allocation unit which computes an allocation amount of computing resources to be used for the analysis with referring to the table and the transition frequency based on an importance of the required sensor in consideration of the current external environment and an environment to which the current external environment may change, and allocates the computing resources for the analysis.

6. The computing resource allocation system according to claim 5,
wherein said memory unit stores a transition history which is a history of transition when an environment has changed to another environments, and
said transition frequency computation unit computes the transition frequency with reference to said transition history.

7. The computing resource allocation system according to claim 6,
wherein said transition history stores respective histories by dividing into plural situations, and
said transition frequency computation unit computes the transition frequency with reference to the history of the same situation in said transition history.

8. The computing resource allocation system according to claim 5,
wherein said transition frequency computation unit computes the transition frequency when an environment has changed to another environment.

9. The computing resource allocation system according to claim 5,
wherein operation of said sensors is made invalid in case that the transition frequency is 0.

10. A computing resource allocation method of a computing resource allocation device, comprising:
analyzing an input value from a sensor, and recognizing an external environment which specifies a current external environment;
performing transition frequency computation which computes a transition frequency that an external environment changes to another external environment; and
computing an allocation amount of computing resources to be used for the analysis with referring to a table which correlates a sensor required for specifying the external environment from the current external environment and the transition frequency based on an importance of the required sensor in consideration of the current external environment and an external environment to which the current external environment may change, and allocating the computing resources for the analysis.

11. The computing resource allocation method of a computing resource allocation device according to claim 10,
wherein said transition frequency computation step computes the transition frequency with reference to a transition history which is a history of transition when an environment has changed to another environment.

12. The computing resource allocation method of a computing resource allocation device according to claim 11,
wherein said transition history stores respective histories by dividing into plural situations, and
said transition frequency computation computes the transition frequency with reference to the history of the same situation in said transition history.

13. The computing resource allocation method of a computing resource allocation device according to claim 10,
wherein said transition frequency computation computes the transition frequency when an environment has changed to another environment.

14. A computing resource allocation method of a computing resource allocation system comprising:
transmitting input values detected by plural sensors to a computing resource allocation device;
analyzing an input value from the sensors using the computing resource allocation device, and recognizing an external environment which specifies a current external environment;
computing transition frequency computation which computes a transition frequency that an external environment changes to another external environment; and
computing an allocation amount of computing resources to be used for the analysis with referring to a table which correlates a sensor required for specifying the external environment from the current external environment and the transition frequency based on an importance of the required sensor in consideration of the current external environment and an external environment to which the current external environment may change, and allocating the computing resources for the analysis.

15. The computing resource allocation method of a computing resource allocation system according to claim 14,
wherein said transition frequency computation computes the transition frequency with reference to a transition history which is a history of transition when an environment has changed to another environment.

16. The computing resource allocation method of a computing resource allocation system according to claim 15,
wherein said transition history stores respective histories by dividing into plural situations, and
said transition frequency computation computes the transition frequency with reference to the history of the same situation in said transition history.

17. The computing resource allocation method of a computing resource allocation system according to claim 14, wherein said transition frequency computation computes the transition frequency when an environment has changed to another environment.

18. The computing resource allocation method of a computing resource allocation system according to claim 14, wherein operation of said sensors is made invalid in case that the transition frequency is 0.

19. A non-transitory computer-readable medium embodying a program making a computer work as:
    an external environment recognition process for analyzing an input value from sensors, and recognizing an external environment which specifies a current external environment;
    a transition frequency computation process for computing a transition frequency that an external environment changes to another external environment; and
    a computing resources allocation process for computing an allocation amount of computing resources to be used for the analysis with referring to a table which correlates a sensor required for specifying the external environment from the current external environment and the transition frequency based on an importance of the required sensor in consideration of the current external environment and an external environment to which the current external environment may change, and allocating the computing resources for the analysis.

20. A non-transitory computer-readable medium embodying a program making a computer work as:
    a transmitting process for transmitting input values detected by plural sensors to a computing resources allocation device;
    an external environment recognition process for analyzing the input value from the sensors using the computing resource allocation device, and recognizing an external environment which specifies a current external environment;
    a transition frequency computation process for computing a transition frequency that an external environment changes to another external environment; and
    a computing resources allocation processing for computing an allocation amount of computing resources to be used for the analysis with referring to a table which correlates a sensor required for specifying the external environment from the current external environment and the transition frequency based on an importance of the required sensor in consideration of the current external environment and an external environment to which the current external environment may change, and allocating the computing resources for the analysis.

21. A computing resource allocation device comprising:
    external environment recognition means for analyzing an input value from a sensor and specifying a current external environment;
    memory means for storing a table which correlates a sensor required for specifying an external environment;
    transition frequency computation means for computing a transition frequency that an external environment changes to another external environment; and
    computing resource allocation means for computing an allocation amount of computing resources to be used for the analysis with referring to the table and the transition frequency based on an importance of the required sensor in consideration of the current external environment and an external environment to which the current external environment may change, and allocating the computing resources for the analysis.

22. A computing resource allocation system including plural sensors and a computing resource allocation device which analyzes an input value from the sensors, characterize in that:
    said sensors comprising a transmitting means for transmitting a detected input value to said computing resource allocation device, and
    said computing resource allocation device comprising:
        external environment recognition means for analyzing the input value from said sensors, and specifying a current external environment;
        memory means for storing a table which correlates a sensor required for specifying an external environment;
        transition frequency computation means for computing a transition frequency that an external environment changes to another external environment; and
        computing resource allocation means for computing an allocation amount of computing resources to be used for the analysis with referring to the table and the transition frequency based on an importance of the required sensor in consideration of the current external environment and an external environment to which the current external environment may change, and allocating the computing resources for the analysis.

* * * * *